US010968106B2

(12) United States Patent
Troegel et al.

(10) Patent No.: US 10,968,106 B2
(45) Date of Patent: Apr. 6, 2021

(54) PRODUCTION OF SI/C COMPOSITE PARTICLES

(71) Applicant: WACKER CHEMIE AG, Munich (DE)

(72) Inventors: Dennis Troegel, Ottensoos (DE); Jelena Pantelic-Seidl, Germering (DE)

(73) Assignee: Wacker Chemie AG, Munich (DE)

( * ) Notice: Subject to any disclaimer, the term of this patent is extended or adjusted under 35 U.S.C. 154(b) by 78 days.

(21) Appl. No.: 16/324,323

(22) PCT Filed: Aug. 11, 2016

(86) PCT No.: PCT/EP2016/069147
§ 371 (c)(1),
(2) Date: Feb. 8, 2019

(87) PCT Pub. No.: WO2018/028790
PCT Pub. Date: Feb. 15, 2018

(65) Prior Publication Data
US 2019/0177171 A1 Jun. 13, 2019

(51) Int. Cl.
C01B 32/956 (2017.01)
H01M 4/04 (2006.01)
(Continued)

(52) U.S. Cl.
CPC ............ C01B 32/956 (2017.08); C01B 32/00 (2017.08); C01B 33/02 (2013.01); H01M 4/0471 (2013.01);
(Continued)

(58) Field of Classification Search
None
See application file for complete search history.

(56) References Cited

U.S. PATENT DOCUMENTS 6,075,084 A * 6/2000 Mabry ..................... A01H 5/08
524/495
8,999,581 B2 4/2015 Lee et al.
(Continued)

FOREIGN PATENT DOCUMENTS

CN 101339987 A 1/2009
EP 1730800 B1 5/2008
(Continued)

OTHER PUBLICATIONS

Datta M K Et Al: In Situ Electrochemical Synthesis of Lithiated Silicon-carbon Based Composites Anode Materials for Lithium Ion Batteries Journal of Power Sources, Elsevier SA, CH, vol. 194, No. 2, Dec. 1, 2009 (Dec. 1, 2009), pp. 1043-1052, XP026499697, ISSN: 0378-7753, [retrieved on Jun. 21, 2009], DOI: 10.1016/J.JPOWSOUR.2009.06.033 XP026499697.
(Continued)

Primary Examiner — Katie L. Hammer
(74) Attorney, Agent, or Firm — Brooks Kushman P.C.

(57) ABSTRACT

The invention provides processes for producing precomposite particles by mixing silicon particles, polyacrylonitrile and one or more carbon additives (C additives) based on one carbon polymorph, optionally one or more organic pore formers and optionally one or more inorganic additives, each in the form of a powder, wherein no solvent is added before and during the mixing, and the inorganic additives are selected from the group comprising halides of the alkali metals and alkaline earth metals, carbonates of the alkali metals, zinc oxide, magnesium carbonate and nickel sulfide, wherein the polyacrylonitrile, the silicon, particles and/or the C additives are wholly or partly initially charged prior to the mixing or are wholly or partly metered in during the mixing, with the proviso that, without polyacrylonitrile in the initial charge, the silicon particles and/or the C additives are at least partly metered in together with polyacrylonitrile (Continued)

or after addition of polyacrylonitrile. The invention further provides processes for producing Si/C composite particles, characterized in that the aforementioned precomposite particles are subjected to thermal treatment.

15 Claims, 2 Drawing Sheets

(51) Int. Cl.

| | |
|---|---|
| H01M 4/134 | (2010.01) |
| H01M 4/36 | (2006.01) |
| H01M 4/38 | (2006.01) |
| H01M 4/62 | (2006.01) |
| C01B 33/02 | (2006.01) |
| C01B 32/00 | (2017.01) |
| H01M 10/052 | (2010.01) |

(52) U.S. Cl.
CPC .......... H01M 4/134 (2013.01); H01M 4/362 (2013.01); H01M 4/364 (2013.01); H01M 4/386 (2013.01); H01M 4/625 (2013.01); C01P 2004/03 (2013.01); C01P 2004/32 (2013.01); C01P 2004/64 (2013.01); H01M 10/052 (2013.01)

(56) References Cited

U.S. PATENT DOCUMENTS

| | | | | |
|---|---|---|---|---|
| 2003/0148184 | A1* | 8/2003 | Omaru | H01M 10/0525 429/231.95 |
| 2007/0281216 | A1 | 12/2007 | Petrat et al. | |
| 2008/0166474 | A1* | 7/2008 | Deguchi | H01M 4/366 427/122 |
| 2009/0208844 | A1 | 8/2009 | Kepler et al. | |
| 2010/0273058 | A1 | 10/2010 | Lee et al. | |
| 2011/0165468 | A1 | 7/2011 | Alias et al. | |
| 2014/0287315 | A1 | 9/2014 | Troegel et al. | |
| 2014/0332717 | A1* | 11/2014 | Paireau | H01M 4/362 252/182.1 |
| 2016/0365567 | A1 | 12/2016 | Troegel et al. | |

FOREIGN PATENT DOCUMENTS

| | | | |
|---|---|---|---|
| EP | 2782167 A1 | 9/2014 | |
| EP | 3035418 A1 | 6/2016 | |
| WO | 05096414 A2 | 10/2005 | |
| WO | 2007133005 A | 11/2007 | |
| WO | 13155397 A1 | 10/2013 | |
| WO | WO-2015022964 A1 * | 2/2015 | ........... H01M 4/366 |
| WO | 15117838 A1 | 8/2015 | |

OTHER PUBLICATIONS

Juchen Guo Et Al: Cyclability Study of Siliconcarbon Composite Anodes for Lithium-Ion Batteries Using Electrochemical Impedance Spectroscopy Electrochimica Acta, Elsevier Science Publishers, Barking, GB, vol. 56, No. 11, Feb. 4, 2011 (Feb. 4, 2011), pp. 3981-3987, XP028480540, ISSN: 0013-4686, [retrieved on Feb. 18, 2011], DOI: 10.1016/J.ELECTACTA.2011.02.014.
Madhuri Thakur Et Al: Inexpensive Method for Producing Macroporous Silicon Particulates (mpsps) With Pyrolyzed Polyacrylonitrile for Lithium Ion Batteries Scientific Reports, vol. 2, Nov. 8, 2012 (Nov. 8, 2012), XP055170815, DOI: 10.1038/srep00795 , XP055170815.
X. Hou, J. Power Sources, vol. 248, 2014, pp. 721-728.
A. J. Appleby, J. Power Sources, vol. 163, 2007, pp. 1003-1039.
B. Li, Electrochem. Comm., vol. 49, 2014, pp. 98.
F. Su, Rsc Adv., vol. 4, 2014, (English Abstract).
M. Rossi, J. Power Sources, vol. 246, 2014, pp. 167-177.
R. Weinekotter and H. Gericke, "Mishen von Feststoffen," Springer 1995.

* cited by examiner

PRODUCTION OF SI/C COMPOSITE PARTICLES

CROSS-REFERENCE TO RELATED APPLICATIONS

This application is a U.S. National Phase Application of PCT/EP2016/069147, filed Aug. 11, 2016 the contents of which are incorporated herein by reference in their entireties for all purposes.

FIELD OF THE INVENTION

The invention relates to methods for producing precomposite particles based on silicon particles, polyacrylonitrile, and carbon additives, to methods for producing Si/C composite particles by thermally treating the precomposite particles, and to the use of the method products for producing electrode materials for lithium-ion batteries, more particularly for producing the negative electrodes of lithium-ion batteries.

BACKGROUND OF THE INVENTION

Rechargeable lithium-ion batteries are currently the electrochemical energy stores available commercially that have the highest energy densities, of up to 250 Wh/kg. They are utilized first and foremost in the area of portable electronics, for tools, and also for means of transport, such as bikes or automobiles, for example. Particularly for application in automobiles, however, it is necessary to achieve further significant increases in the energy density of the batteries, so as to extend the ranges of the vehicles.

Used presently as negative electrode material ("anode") in practice, first and foremost, is graphitic carbon. Graphitic carbon is notable for its stable cycle qualities and its decidedly high handling reliability by comparison with lithium metal, which is used in lithium primary cells. During incorporation and release of lithium, graphitic carbon undergoes only slight changes in volume—in the region of 10%, for example, for the limiting stoichiometry of $LiC_6$. A disadvantage, however, is its relatively low electrochemical capacity of theoretically 372 mAh/g, which corresponds to only about one tenth of the electrochemical capacity attainable theoretically using lithium metal.

Conversely, silicon, at 4199 mAh/g, possesses the highest known storage capacity for lithium ions. Disadvantageously, silicon-containing electrode active materials suffer from extreme changes in volume during charging and discharging with lithium, of up to around 300%. This change in volume places a severe mechanical stress on the active material and on the electrode structure as a whole, and this stress, through electrochemical milling, leads to loss of the electrical contacting and hence to the destruction of the electrode, with loss of capacity. Moreover, the surface of the silicon anode material used reacts with constituents of the electrolyte to form, continuously, passivating protective layers (Solid Electrolyte Interface; SEI), resulting in an irreversible loss of mobile lithium.

In order to resolve the problems associated with the severe volume expansion of the active material and the formation of SEI in Si-containing anodes, a variety of approaches have been pursued in recent years to the electrochemical stabilization of Si-containing electrode active materials, as described for example by A. J. Appleby in J. Power Sources 2007, 163, pages 1003 to 1039. In many cases, silicon-containing active material is employed in combination with carbon. In one approach, the Si-containing active material in the form of a physical mixture with graphite is to be inserted into the electrode coating, as taught in EP 1730800 B1. In another approach, the two elements silicon and carbon are combined structurally to form a composite material, as summarized in an overview article by M. Rossi in J. Power Sources 2014, 246, pages 167 to 177.

Of critical importance to the processing and also the electrochemical performance of such particles are their structure and their size. There is a desire, accordingly, for spherical microparticles based on silicon and conductive carbon, since these particles, by virtue of their spherical structure, are able to absorb the isotropic volume expansion of silica in all spatial directions more evenly than nonspherical particles.

Spherical, microscale Si/C composite particles are produced in an established way via a spray drying step. This is done by spraying dispersions of silicon particles, carbon precursors (sugar or pitch, for example), and optionally further carbon-containing additives to form droplets which, in the course of drying, maintain their drop shape and drop size and so form spherical precomposite particles. Subsequent carbonization of the carbon precursors converts the precomposite particles into Si/C composite particles. One process of this kind is described, for example, in U.S. 2011165468. The spray drying processes of B. Li lead, to composite particles which in their interior contain a porous mesh of carbon and Si nanoparticles (Electrochem. Comm. 2014, 49, 98). F. Su (RSC Adv. 2014, 4, pages 43114 to 43120) describes a similar approach using conductive carbon black, nano-silicon, and sucrose. X. Hou (J. Power Sources 2014, 148, pages 721 to 728) describes a two-stage process for producing Si/C composite particles, in which, first, nano-silicon is spray-dried together with graphite and citric acid as C precursors. After temperature treatment, the products of drying were coated with pitch, after which they were subjected to spray drying and, lastly, to pyrolysis.

Spray drying operations, disadvantageously, entail the use of considerable quantities of solvents, often times organic solvents, which are evaporated, with consumption of energy, during the spraying operation and are condensed again after the product has been removed. Solvents and spraying gas must then be laboriously separated again and recycled. Moreover, the atomization of dispersions comprising organic solvents requires inert spraying gases, such as nitrogen or argon, and this is a further cost factor.

With commonplace spray drying processes, additionally, the problem exists that in the course of the spray drying, different particles stick to or fuse with one another and so form aggregated particles, also called secondary particles. Further aggregation of particles may occur during the carbonization of conventional spray drying products, by different particles sintering to one another. The resulting Si/C composite particles no longer have a spherical structure and also contain considerable fractions of coarse particles and exhibit a wide particle size distribution, which is a disadvantage for their further processing as anode active material for lithium-ion batteries.

For these reasons there is a need for methods which lead to suitable Si/C composite particles for anode active materials, without the use of solvents. Dry mixing operations have been discussed for this purpose, where silicon particles are mixed or ground with other components in dry form and are subsequently converted by thermal carbonization into Si/C composites.

For example, U.S. Pat. No. 8,999,581 describes the production of Si/G/C particles, where first of all metals or semimetals, such as silicon, for example, and graphite (G) are converted by means of a rotor mill into assembled (semi)metal/graphite spheres; the assembled (semi)metal/graphite spheres are subsequently coated with pitch-based amorphous carbon; and the resulting intermediate, lastly, is carbonized. A multistage mixing and coating method of this kind is costly and inconvenient. Moreover, only methods using solvent have been specifically described. CN101339987 describes methods for producing core-shell particles that involve first mixing silicon powder and graphite by joint grinding to produce the core particle, and then adding bitumen or polymers, such as pitch, tar, polyvinyl alcohol or epoxy resin, as carbon precursors, for the shell. Finally, the carbon precursors are carbonized, and the products are ground and sieved. US2009208844, for example, describes particles produced by carbonization of mixtures comprising active materials such as silicon and also expanded graphite and further carbon precursor material, such as pitch or organic polymers, examples being polyaromatics, polyvinyl alcohol, phenolic resin, or starch. Oversize and aggregates are separated off in a separate sieving step. EP2018677 describes core-shell composite particles having a core made of metals, such as silicon, and metal oxides, and also an amorphous carbon coating, and also a crystalline carbon coating, as a shell. The amorphous carbon coating is applied by the CVD method or by coating of the core with organic carbon precursors, such as pitch, phenolic resins, polyvinyl chloride or polyvinyl alcohol, with subsequent thermal carbonization. WO13155397 as well describes composite particles based on silicon particles, carbon material, such as conductive carbon black, and organic polymers. In WO13155397, silicon particles are ground in the presence of buffering particles, examples being oxides or carbides of silicon, aluminum, titanium, or boron.

BRIEF SUMMARY OF THE INVENTION

Against this background, therefore, the object was to develop methods for producing precomposite particles and Si/C composite particles that operate without addition of solvents and lead to unaggregated or minimally aggregated precomposite particles which, through thermal treatment or carbonization, result in unaggregated or minimally aggregated Si/C composite particles. As far as possible, costly and inconvenient removal of oversize or underside ought to be avoided. Moreover, the precomposite particles ought to be accessible in an extremely technologically simple, single-stage method.

DETAILED DESCRIPTION OF PREFERRED EMBODIMENTS

Figure 1:
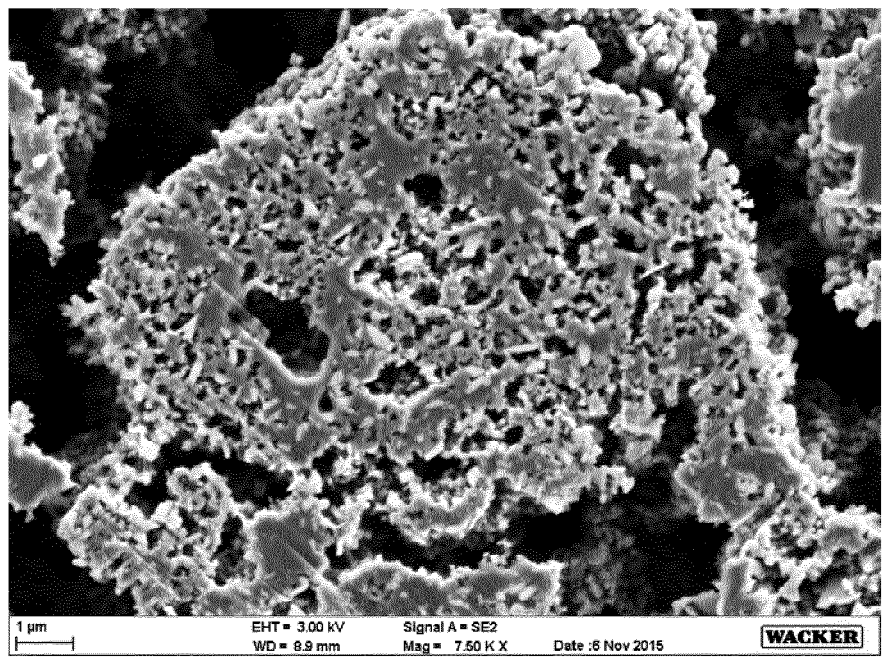
FIG. 1 is an SEM image of unaggregated, microscale Si/C composite particles according to Example 1.

A subject of the invention are methods for producing precomposite particles, by mixing
  silicon particles, polyacrylonitrile, and one or more carbon additives (C additives) based on a carbon modification,
  optionally one or more organic pore formers, and optionally one or more inorganic adjuvants,
  each in the form of a powder, where
  before and during the mixing no solvent is added, and
  the inorganic adjuvants are selected from the group encompassing halides of the alkali metals and alkaline earth metals, carbonates of the alkali metals, sine oxide, magnesium carbonate, and nickel sulfide,
  where the polyacrylonitrile, the silicon particles and/or the C additives are entirely or partially initially introduced before the mixing or entirely or partially metered in during the mixing,
  with the proviso that, without polyacrylonitrile in the initial charge, the silicon particles and/or the C additives are metered in at least proportionately together with polyacrylonitrile or after addition of polyacrylonitrile.

A precomposite particle is generally an agglomerate based on silicon particles, C additives, and polyacrylonitrile and also optionally organic pore formers and optionally inorganic adjuvants. Under mechanical exposure, agglomerates may break apart again into their individual constituents.

Polyacrylonitrile may generally be homopolymers of acrylonitrile or copolymers of acrylonitrile and one or more ethylenically unsaturated comonomers. Examples of comonomers are styrene, butadiene, acrylates, and methacrylates. Polyacrylonitrile is based preferably to an extent of at least 80 wt %, more preferably at least 85 wt %, more preferably still at least 95 wt %, and most preferably at least 98 wt % on acrylonitrile. Preferred are copolymers of methacrylate and at least 90 wt % of acrylonitrile, and copolymers with at least 98 wt % of acrylonitrile, more particularly homopolymers of acrylonitrile.

Polyacrylonitrile can be converted generally by thermal treatment into conductive carbon structures.

The precomposite particles are based preferably, to an extent of ≤60 wt %, more preferably ≤50 wt %, and most preferably ≤45 wt % on polyacrylonitrile. The precomposite particles are based preferably, to an extent of ≤5 wt %, more preferably ≥7 wt %, and most preferably ≥10 wt % on polyacrylonitrile. The aforementioned figures in wt % are based in each case on the total weight of the precomposite particles.

The weight ratio of the silicon particles to polyacrylonitrile is preferably ≤10, more preferably ≤5, and most preferably ≤3. The weight ratio of the silicon particles to C additive is preferably ≥0.01, more preferably ≥0.05, and most preferably ≥0.1.

C additives used may be crystalline, semicrystalline or, preferably, noncrystalline (amorphous) carbon compounds. Examples of crystalline or semicrystalline C additives are graphite, expanded graphite, and fullerene. Noncrystalline (amorphous) C additives are understood, generally, to comprise carbon fibers, glassy carbon, graphene, activated carbon, carbon blacks, carbon nanotubes, carbon nanofoams, aerographite, and nongraphitic carbons.

Preferred C additives are selected from, the group encompassing graphite, (conductive) carbon black, activated carbon, carbon nanotubes (CNTs), fullerenes, and graphene.

Particularly preferred C additives are graphite, conductive carbon black, and activated carbon.

In one preferred embodiment the C additives used include no crystalline or semicrystalline carbon compounds, more particularly no graphite.

The most preferred C additives are conductive carbon black and activated carbon.

The precomposite particles are based preferably to an extent of ≤90 wt %, more preferably ≤85 wt %, and most preferably ≤80 wt % on C additives. The precomposite particles are based preferably to an extent of ≥3 wt %, sore preferably ≥5 wt %, and most preferably ≥10 wt % on C additives. The aforementioned figures in wt % are based in each case on the total weight of the precomposite particles.

The weight ratio of polyacrylonitrile to C additive is preferably ≥0.1, more preferably ≥0.4, very preferably ≥0.7. The weight ratio of polyacrylonitrile to C additive is preferably ≤20, more preferably ≤15, and most preferably ≤10.

Silicon particles may consist of elemental silicon, a silicon oxide, or a binary, ternary or multinary silicon/metal alloy (with, for example, Li, Ma, K, Sn, Ca, Co, Mi, Cu, Cr, Ti, Al, Fe). Elemental silicon is used preferably, particularly since it has an advantageously high storage capacity for lithium ions.

Elemental silicon refers generally to high-purity polysilicon, with a low proportion of foreign atoms (for example, B, P, As), silicon specifically doped with foreign atoms (for example B, As), but also silicon from metallurgical processing, which may include elemental impurities (for example, Fe, Al, Ca, Cu, Zr, C).

If the silicon particles include a silicon oxide, then the stoichiometry of the oxide $SiO_x$ is preferably in the $0<x<1.3$ range. If the silicon particles include a silicon oxide with a higher stoichiometry, then the layer thickness thereof on the surface is preferably less than 10 nm.

If the silicon particles are alloyed with an alkali metal M, then the stoichiometry of the alloy $M_ySi$ is preferably in the $0<y<5$ range. The silicon particles may optionally have been prelithiated. Where the silicon particles are alloyed with lithium, the stoichiometry of the alloy $Li_xSi$ is preferably in the $0<z<2.2$ range.

Particularly preferred are silicon particles which contain ≥80 mol % of silicon and/or ≤20 mol % of foreign atoms, very preferably ≤10 mol % of foreign atoms.

The surface of the silicon particles may optionally be covered by an oxide layer or by other organic and inorganic groups. Particularly preferred silicon particles carry on their surface Si—OH or Si—H groups or organic groups attached covalently, such as alcohols or alkenes, for example.

The silicon particles used in producing the precomposite particles have volume-weighted particle size distributions with median diameters $d_{50}$ of preferably 50 nm to 50 μm, more preferably 100 nm to 30 μm, and most preferably 150 nm to 10 μm.

The volume-weighted particle size distribution is determinable by static laser scattering, employing the Fraunhofer model or the Mie model, using the Horiba LA 950 instrument, with ethanol or isopropanol as dispersing medium for the silicon particles.

The silicon particles are preferably unagglomerated and more particularly unaggregated.

Aggregated means that spherical or very largely spherical primary particles, of the kind formed, for example, initially in gas phase operations for the production of silicon particles, coalesce in the further course of reaction in the gas phase operation and form aggregates. In the further course of reaction, these aggregates may form agglomerates.

Agglomerates are a loose cluster of aggregates. Agglomerates may be split back into the aggregates easily by typically employed kneading and dispersing processes. Aggregates can be broken down into the primary particles not at all, or only partly, by these processes. On the basis of the way in which they come about, aggregates and agglomerates inevitably have entirely different sphericities and grain morphologies than the silicon particles of the invention. The presence of silicon particles in the form of aggregates or agglomerates may be visualized using conventional scanning electron microscopy (SEM), for example. Conversely, static light scattering methods for determining the particle size distributions or particle diameters of silicon particles are unable to distinguish between aggregates or agglomerates.

The silicon particles have a sphericity of preferably $0.3 \leq \Psi \leq 1$, more preferably $0.4 \leq \Psi \leq 1$, and most preferably $0.5 \leq \Psi \leq 1$. The sphericity $\Psi$ is the ratio of the surface area of a sphere of equal volume to the actual surface of a body (definition by Wadell). Sphericities may be determined, for example, from conventional SEM micrographs.

The silicon particles preferably have certain properties of bulk materials. Properties of bulk materials are described for example in the international standard FEM 2.581 of the "Federation Europeenne de la Manutention". The standard FEM 2.582 defines the general and specific properties of bulk materials with regard to their classification. Characteristic values which describe the consistency and the condition of the materials are, for example, grain morphology and grain size to distribution (FEM 2.581/FEM 2.582: General characteristics of bulk products with regard to their classification and their symbolization).

According to DIN ISO 3435, bulk materials can be subdivided into six different grain morphologies depending on the nature of the grain edges:

I: sharp edges with approximately equal extents in the three dimensions (e.g.: cubes);
II: sharp edges of which one is much longer than the other two (e.g.: prism, blade);
III: sharp edges of which one is much smaller than the two others (e.g.; plate, flakes);
IV: round edges with approximately equal extents in the three dimensions (e.g.: sphere);
V: round edges, much, greater in one direction than in the other two (e.g.: cylinder, rod);
VI: fibrous, filamentary, curviform, convoluted.

The silicon particles preferably have grain morphologies I to VI, more preferably I, II, III or IV, and with particular preference I or IV in accordance with BIN ISO 3435.

The precomposite particles are based preferably on silicon particles to an extent of ≤70 wt %, more preferably ≤65 wt %, and most preferably ≤60 wt %. The precomposite particles are based on silicon particles preferably to an extent of ≤5 wt %, more preferably ≥10 wt %, and most, preferably ≥15 wt %. The aforesaid figures in wt % are based in each case on the total weight of the precomposite particles.

The weight ratio of the silicon particles to C additive is preferably ≤4, more preferably ≤3, and most preferably ≤2.5. The weight ratio of the silicon particles to C additive is preferably ≥0.1, more preferably ≥0.2, and most preferably ≥0.3.

The silicon particles can be produced, for example, by means of vapor deposition or, preferably, by milling operations.

Milling operations contemplated are dry or wet milling operations. They are preferably carried oat using jet mills, such as opposed jet mills, or impact mills, planetary ball mills or stirred ball mills. The jet mills preferably have an integrated pneumatic classifier, which may be static or dynamic in design, or are operated in a circuit with an external pneumatic classifier.

Wet milling takes place in general in a suspension with organic or inorganic dispersing media. Preferred dispersing media are the dispersing liquids described earlier on above.

In the wet milling, preference is given to using grinding media whose average diameter is 10 to 1000 times greater than, the 90% percentile $d_{90}$ of the diameter of the milling material introduced, based on the particle size volume distribution. Particularly preferred are grinding media whose average diameter is 20 to 200 times greater than the $d_{90}$ of the initial distribution of the milling material.

Preferred inorganic adjuvants are halides of the alkali metals and alkaline earth metals, carbonates of the alkali metals, zinc oxide, magnesium carbonate, and nickel sulfide. The inorganic adjuvants may serve, for example, as pore formers. Pore formers may be released from the particles in a conventional way, to form particles having a greater porosity.

The precomposite particles are based on inorganic adjuvants preferably to an extent of 0 to 25 wt % and more preferably 2 to 20 wt %, based on the total weight of the precomposite particles. Most preferably the precomposite particles contain no inorganic adjuvants and/or no other inorganic constituents.

Additionally, there may be one or more organic pore formers used. Typical organic pore formers have a mass loss of ≥50 wt %, preferably ≥80 wt %, and more preferably ≥90 wt % at a temperature selected from the range from 25 to 1000° C.

Examples of inorganic pore formers are homopolymers or copolymers of ethylenically unsaturated monomers, examples being polyethylene, polypropylene, polystyrene, polybutadiene, poly-tert-butoxystyrene, polyvinyl chloride, polyvinyl acetate, polymethyl methacrylate, polyacrylic acid, polymethacrylate, polyvinyl stearate, polyvinyl laurate or copolymers thereof; polyvinyl alcohol; alkylene glycols, such as ethylene glycol, butylene glycol, diethylene glycol, triethylene glycol; polyalkylene oxides, such as polyethylene oxides, polypropylene oxides or copolymers thereof; lignin, polysaccharides, phenolic resins, melamine resins, resorcinol resins, or polyurethanes. Preferred pore formers are selected from the group encompassing polyethylene, polystyrene, polymethyl methacrylate, alkylene glycols, and polyalkylene oxides, such as polyethylene oxide, polypropylene oxide, and polyethylene oxide-polypropylene oxide copolymers, polyvinyl acetate, and styrene-butadiene copolymer.

The precomposite particles are based on organic pore formers preferably to an extent of 0 to 60 wt %, more preferably 5 to 55 wt %, and most preferably 10 to 50 wt %, based on the total weight of the precomposite particles.

Precomposite particles comprising pore formers lead to Si/C composite particles which, when used in anode active materials of lithium-ion batteries, boost the coulombic efficiency or the electrochemical stability.

The mixtures may also comprise one or more additives, such as, for example, flow control agents, dopants, or substances which improve the electrochemical stability of the electrode in the battery.

The precomposite particles are based on additives preferably to an extent of 0 to 50 wt %, more preferably 1 to 40 wt %, and most preferably 2 to 30 wt %, based on the total weight of the precomposite particles. In one preferred, alternative embodiment, the precomposite particles contain no additives.

The precomposite particles are obtained preferably in the form of isolated particles or loose agglomerates of precomposite particles, but generally not in the form of aggregates of precomposite particles. Agglomerates are clusters of a plurality of precomposite particles. Aggregates are amalgamations of precomposite particles. Agglomerates can be separated into the individual precomposite particles, using kneading or dispersing processes, for example. Aggregates cannot be separated into the individual particles in this way without destruction of precomposite particles.

The precomposite particles are preferably in the form of core-shell particles. Polyacrylonitrile preferably forms the core. The shell is formed preferably by silicon particles and/or C additive. The core-shell particles can be deagglomerated back into their original substances by exposure to ultrasound.

The precomposite particles are preferably spherical, but may also have a sliver shape. The precomposite particles have a sphericity of preferably $0.3 \leq \Psi \leq 1$, more preferably $0.5 \leq \Psi \leq 1$, and most preferably $0.8 \leq \Psi \leq 1$. The sphericity $\Psi$ is the ratio of the surface area of a sphere of equal volume to the actual surface of a body (definition by Wadell). Sphericities may be determined, for example, from conventional SEM micrographs.

The silicon particles, polyacrylonitrile, and the C additives, and also the optional organic pore formers, inorganic adjuvants, and additives are used generally in the form of powders. By powders are meant generally small-particle, particulate, dry solids. The powders may take on a variety of forms, such as powder forms, grain forms or other particle forms.

In the production of the precomposite particles, there is generally no solvent added. The method, therefore, is carried out generally in the absence of solvent. This, however, does not rule out any residual amounts of solvent within the reactants used, as a result of their production, for example. The silicon particles, polyacrylonitrile, the C additives, the organic pore formers, the inorganic adjuvants, the additives and/or the precomposites contain preferably ≤2 wt %, more preferably ≤1 wt %, and most preferably ≤0.5 wt % of solvent.

Examples of solvents are inorganic solvents, such as water, or organic solvents, more particularly hydrocarbons, ethers, esters, nitrogen-functional solvents, sulfur-functional solvents, or alcohols having preferably 1 to 12 carbon atoms and more preferably 1 to 8 carbon atoms. Specific examples of solvents are water, ethanol and 2-propanol, dimethylformamide, N-methyl-2-pyrrolidone, N-ethyl-2-pyrrolidone, and dimethyl sulfoxide.

The silicon particles, polyacrylonitrile, and the C additives, and also the optional organic pore formers, inorganic adjuvants, and additives, are also referred to below, jointly, as starting materials.

For the production of the precomposite particles, the various starting materials are mixed or milled.

Prior to the mixing or milling, the silicon particles, polyacrylonitrile, and the C additives, and also, optionally, the further starting materials, may be partially or, preferably, completely initially introduced. Polyacrylonitrile is preferably initially introduced partly and more preferably completely prior to mixing or milling. The silicon particles, the C additives, and polyacrylonitrile are preferably initially introduced to an extent of ≥10 wt %, more preferably ≥20 wt %, and most preferably ≥30 wt %, based on the total weight of the starting materials. Polyacrylonitrile is preferably initially introduced to an extent of ≥40 wt %, more preferably ≥60 wt %, and most preferably ≥70 wt %, based on the total weight of the polyacrylonitrile employed overall.

Alternatively, polyacrylonitrile and, in particular, the silicon particles, the C additives, and also the further starting materials, where used, may be metered in completely or proportionally during the mixing or milling.

If polyacrylonitrile is partially metered in, and especially if polyacrylonitrile is completely metered in, it is preferred for the amount of silicon particles and/or C additives employed overall, or a fraction thereof, to be metered, in simultaneously with polyacrylonitrile and/or metered in after the complete addition of polyacrylonitrile.

In the case of partial and in particular in the case of complete metered addition of polyacrylonitrile, after the end of the metering of polyacrylonitrile, it is preferred additionally to meter in 0 to 50 wt % and more preferably 0.1 to 30 wt % of silicon particles and/or C additives, based on the total weight of the amount of silicon particles and C additives employed overall.

Generally speaking, therefore, following complete addition of the silicon particles and of the C additives, no further polyacrylonitrile is metered in.

Otherwise, the individual starting materials may be introduced into the mixing apparatus in any desired sequence, in other words spatially separately or spatially jointly, temporally in succession or simultaneously, before or during the mixing. With preference all of the starting materials are introduced into the mixing apparatus spatially separately, before or during the mixing, optionally simultaneously.

Alternatively, it is also possible to produce a premix of one or more various starting materials, which are subsequently mixed with the remaining starting materials. A premix preferably comprises one or more C additives and one or more organic pore formers.

With particular preference, all of the starting materials are subjected to mixing simultaneously.

Commonplace mixers, especially industrial mixers, may be employed. Examples of mixers are free-form mixers, such as container mixers, cone mixers, drum roller mixers, gyro mixers, tumble mixers, or displacement and impeller mixers such as drum mixers and screw mixers. Further examples of suitable mixers are set out in "Mischen von Feststoffen", by R. Weinekötter and H. Gericke, Springer 1995. Alternatively for this purpose it is also possible to use commonplace mills, such as, for example, planetary ball mills, stirred ball mills or drum mills. Preference is given to using screw mixers, drum mixers or drum mills.

Mixing takes place preferably at temperatures of 0 to 50° C. and more preferably 15 to 35° C. In any case, the mixing takes place at temperatures of preferably ≤300° C., more preferably ≤200° C., and very preferably ≤100° C. The duration of mixing is preferably 0.5 to 20 hours, more preferably 1 to 15 hours, and most preferably 1.5 to 10 hours.

A further subject of the invention is a method for producing Si/C composite particles, characterized in that the precomposite particles of the invention are thermally treated.

The thermal treatment converts the precomposite particles into Si/C composite particles. This treatment generally has the effect of carbonizing polyacrylonitrile. In that procedure polyacrylonitrile is converted preferably into inorganic carbon. The carbon yield when carbonizing polyacrylonitrile is preferably ≥15%, more preferably ≥20%, and most preferably ≥25%, based on the total weight of polyacrylonitrile. The carbon in the Si/C composite particles may be crystalline or amorphous and may also include mixtures of crystalline and amorphous constituents.

Because of the inventive production of the Si/C composite particles, the silicon particles and the C additives therein are generally embedded entirely or partly in carbon. The surface of the Si/C composite particles preferably consists entirely or partly, more preferably substantially, of carbon.

The Si/C composite particles are obtained preferably in the form of isolated particles or loose agglomerates of Si/C composite particles, but generally not in the form of aggregates of Si/C composite particles. Any agglomerates of Si/C composite particles can be separated into the individual Si/C composite particles, by means of kneading or dispersing processes, for example. In contrast aggregates of Si/C composite particles cannot be separated into the individual particles in this way without destruction of Si/C composite particles.

The Si/C composite particles typically have BET surface areas of preferably 1 to 200 $m^2/g$, more preferably 2 to 150 $m^2/g$, and most preferably 5 to 100 $m^2/g$ (determined according to DIN ISO 9277:2003-05).

The Si/C composite particles are preferably spherical, but may also have a sliver shape. The Si/C composite particles have a sphericity of preferably 0.3≤Ψ≤1, more preferably 0.5≤Ψ≤1, and most preferably 0.8≤Ψ≤1. The sphericity Ψ is the ratio of the surface area of a sphere of equal volume to the actual surface of a body (definition by Wadell). Sphericities may be determined, for example, from conventional SEM micrographs.

The Si/C composite particles have volume-weighted particle size distributions with diameter percentiles $d_{50}$ of preferably ≥0.5 μm, more preferably ≥1 μm, and most preferably ≥2 μm. The Si/C composite particles have $d_{50}$ values of preferably ≤100 μm, more preferably ≤50 μm, very preferably ≤36 μm, and most preferably ≤20 μm.

The particle size distribution of the Si/C composite particles may be bimodal or polymodal and is preferably monomodal, more preferably narrow. The volume-weighted particle size distribution of the Si/C composite particles has a breadth $(d_{90}-d_{10})/d_{50}$ of preferably ≤3, more preferably ≤2.5, very preferably ≤2, and most preferably ≤1.5.

The volume-weighted particle size distribution of the Si/C composite particles was determined by static laser scattering, employing the Mie model, using the Horiba LA 950 instrument, with ethanol as dispersing medium for the Si/C composite particles.

The Si/C composite particles have a degree of aggregation of preferably ≤20%, more preferably ≤15%, and most preferably ≤10%. The degree of aggregation is determined by sieve analysis. The degree of aggregation corresponds to the percentage of the particles which, after dispersion in ethanol with simultaneous ultrasound treatment, do not pass through a sieve having a mesh size of 20 μm.

The Si/C composite particles are preferably porous. The Si/C composite particles comprise pores having diameters of preferably ≥60 nm, more preferably ≥100 nm, and most preferably ≥200 nm. The pores have diameters of preferably ≤1400 nm, more preferably ≤700 nm, and most preferably ≤400 nm (method of determination: scanning electron microscopy (SEM)).

With particular preference there are silicon particles located in pores. The proportion of the silicon particles that are located in pores is preferably ≥5%, more preferably ≥20%, and most preferably ≥50%, based on the total number of silicon particles in the Si/C composite particles (method of determination: scanning electron microscopy (SEM)).

The Si/C composite particles are based on silicon to an extent, of preferably 5 to 50 wt %, more preferably 10 to 40 wt %, most preferably 20 to 40 wt %; preferably 50 to 95 wt %, more preferably 60 to 85 wt %, most preferably 60 to 80 wt % carbon. Moreover, there may be oxygen contents of, for example, ≤20 wt %, preferably ≤10 wt %, and more preferably ≤5 wt %, in the form, for example, of a native $SiO_2$ layer on the silicon particles. Certain amounts of nitrogen in the Si/C composite particles are advantageous and amount for example to 0.5 to 10 wt % and more preferably to between 2 and 5 wt %. Nitrogen is present here preferably in chemically bonded form as heterocycles—for example, as pyridine units or pyrrole units (N). Besides the stated main constituents, there may also be further chemical elements present, in the form of a deliberate addition or of chance impurity: such as, for example, Li, Fe, Al, Cu, Ca, K, Na, S, Cl, Zr, Ti, Ft, Ni, Cr, Sn, Mg, Ag, Co, Zn, B, P, Sb, Pb, Ge, Bi, rare earths; the amounts thereof are preferably ≤1 wt % and more preferably ≤100 ppm. The aforesaid figures in wt % are based in each case on the total weight of the Si/C composite particles. The figures in wt % are based in each case on the total weight of the Si/C composite particles.

The thermal treatment of the precomposite particles takes place at temperatures of preferably 400 to 1400° C., more preferably 700 to 1200° C., and most preferably 900 to 1100° C.

The thermal treatment may take place, for example, in a tube furnace, annealing furnace, rotary tube furnace or fluidized bed reactor. Through choice of the type of reactor it is possible to carry out the carbonization statically or with continual mixing of the reaction medium.

The thermal treatment may take place under aerobic or anaerobic conditions. For example, a first thermal treatment may be carried out at temperatures up to 300° C. in an oxygen-containing atmosphere, and a second thermal treatment at temperatures >300° C. in an inert gas atmosphere. The thermal treatment is carried out preferably in an inert gas atmosphere, such as nitrogen or preferably argon atmosphere. The inert gas atmosphere may optionally further include fractions of a reducing gas, such as hydrogen. With preference the thermal treatment is accomplished anaerobically. The inert gas atmosphere may be static over the reaction medium or may flow over the reaction mixture in the form of a gas flow. The flow rates in that case are preferably up to 1 liter per minute, more preferably 100 to 600 mL/min, and most preferably 200 to 250 mL/min, particularly in the case of the carbonization of 2 to 150 g of precomposite particles or a reactor volume of 7000 to 11 000 $cm^3$. The heating rates when heating the reaction mixture are preferably 1 to 20° C. per minute, more preferably 1 to 15° C./min, very preferably 1 to 10° C./min, and most preferably 3 to 5° C./min. Also possible, furthermore, is a staged operation with different intermediate temperatures and intermediate heating rates. When the target temperature has been reached, the reaction mixture is customarily conditioned at the temperature for a certain time or immediately cooled thereafter. Hold times of, for example, 30 min to 24 h, preferably 1 to 10 h, and more preferably 2 to 3 h are advantageous. Cooling may be carried out actively or passively, uniformly or in stages.

The resultant Si/C composite particles may be supplied immediately to their further exploitation, to produce electrode materials, for example, or alternatively may first be aftertreated mechanically, by milling or sieving, for example, or freed from oversize or undersize by classifying technologies (sieving, sifting). With preference, mechanical aftertreatments or classifying are omitted, and more particularly any milling, sieving or sifting is omitted.

The surface of the Si/C composite particles can also be modified, by application, for example, of one or more coatings, more particularly of a carbon coating. For this purpose the Si/C composite particles may first be coated with one or more carbon precursors, after which carbonization may be carried out. Carbon precursors are, for example, tars or pitches, more particularly high-melting pitches, hard carbon (nongraphitizable at temperatures of 2500 to 3000° C.), and soft carbon (graphitizable at temperatures of 2500 to 3000° C.). The carbonization may take place, for example, like the thermal treatment described earlier on above for the carbonization of the precomposite particles. The Si/C composite particles may alternatively be coated by conventional CVD (chemical vapor deposition) methods with hydrocarbons having 1 to 20 carbon atoms as carbon precursors. In this way, carbon-coated Si/C composite particles are obtained.

The resulting carbon coating on the Si/C composite particles preferably has a porosity of ≤2% and more preferably ≤1% (method for determining the overall porosity: 1 minus [ratio of the apparent density (determined by means of xylene pycnometry in accordance with DIN 51901) to the skeletal density (determined by means of He pycnometry in accordance with DIN 66137-2)]).

The carbon coating on the Si/C composite particles is generally impervious to liquid media, such as aqueous or organic solvent or solutions, especially aqueous or organic electrolytes, acids or alkalis.

The Si/C composite particles of the invention are suitable, for example, as silicon-based active materials for anode active materials for lithium-ion batteries.

A further subject of the present invention is the use of the Si/C composite particles in electrode materials for lithium-ion batteries, more particularly for producing the negative electrodes of lithium-ion batteries.

The Si/C composite particles can be used as a silicon component for electrode materials of lithium-ion batteries. Lithium-ion batteries of this kind may be produced for example as described in WO 2015/117838.

Advantageously, the precomposite particles are obtainable by the method of the invention, starting from starting materials available on the market, in a single-stage method without using solvent. The spray drying step which is customary in other methods for producing precomposite particles, with the associated use of solvents and expenditure for the cleaning of spraying gases, can therefore be omitted.

By carbonization of the precomposite particles it is possible to obtain Si/C composite particles in which the silicon particles and the carbon additive are embedded in an amorphous carbon matrix.

Surprisingly, by the solvent-free method of the invention, precomposite particles and Si/C composite particles can be obtained which in terms of their particle sizes match the corresponding products of spray drying. Moreover, the different components are distributed homogeneously within the particles. Sticking together or sintering together, and hence aggregation, of different particles, surprisingly, did not occur. The fact, that polyacrylonitrile also has binder properties made this all the more surprising. Consequently, there was a risk of the individual components sticking together and giving rise to products entirely unusable for a node active materials. Surprisingly, with the inventive use of the components of the invention for producing the precomposite particles and the Si/C composite particles, this risk came to nothing.

Interestingly, the individual precomposite particles are obtained in the form of loose agglomerates which can be separated back into their individual constituents by means of ultrasound treatment, for example, but which after carbonization produce Si/C composite particles which exhibit the desired mechanical stability and from which the individual components can no longer be isolated.

The Si/C composite particles produced in accordance with the invention have the properties required for anode active materials of lithium-ion batteries, such as particle sizes and particle size distributions. There is no need for costly and inconvenient milling and sieving.

The examples which follow serve for further elucidation of the invention.

Analytical methods and instruments used for characterizing the Si/C composites obtained were as follows:

Scanning Electron Microscopy (SEM/EDX):

The microscopic studies were carried out with a Zeiss ultra 55 scanning electron microscope a net an INCA x-sight energy-dispersive x-ray spectrometer. Prior to the study, the samples were vapor-coated with carbon in order to prevent charging phenomena, using a Baltec SCD500 sputter/carbon coating unit. The cross sections of the Si/C composite particles, which are shown in the figures, were produced using a Leica TIC 3x ion cutter at 6 kV.

Inorganic Analysis/Elemental Analysis:

The C contents reported in the examples were determined using a Leco CS 230 analyzer; for the determination of O and, where appropriate, N and H contents, a Leco TCH-600 analyzer was employed. The qualitative and quantitative determination of other reported elements in the Si/C composite particles was carried out by means of ICP (inductively coupled plasma)-emission spectrometry (Optima 7300 DV from Per kin Elmer). For this analysis, the samples were subjected to acid digestion (HF/HNO$_2$) in a microwave (Microwave 3000 from Anton Paar). The ICP-OES determination is based on ISO 11885 "Water quality—Determination of selected elements by inductively coupled plasma optical emission spectrometry (ICP-OES) (ISO 11885: 2007); German version of EN ISO 11885:2009", which is employed for investigation of acidic, aqueous solutions.

Particle Size Determination:

For the purposes of this invention, the particle size distribution was determined according to ISO 13320 by means of static laser scattering with a Horiba LA 950. Here, when preparing the samples, it is necessary to pay particular attention to the dispersal of the particles in the measurement solution, so as not to measure the size of agglomerates rather than individual particles. For this purpose, the Si/C composite particles were dispersed in ethanol, and before the measurement the dispersion was treated with 250 W ultrasound for 4 minutes in a Hielscher UIS250v laboratory ultrasound device with LS24d5 sonotrode.

Unless otherwise indicated, the inventive and comparative examples hereinafter were carried out in ambient air at 1013 mbar and 23° C. The methods used in the examples were as follows:

Carbonization:

All of the carbonizations carried out in the examples were conducted using a 1200° C. three-zone tube furnace (TFZ 12/65/550/E301) from Carbolite GmbH and using cascade regulation, including a type N probe thermocouple. The stated temperatures relate to the internal temperature of the tube furnace at the location of the thermocouple. Each starting material to be carbonized was weighed into one or more fused silica combustion boats (QCS GmbH) and introduced into a working tube made of fused silica. The settings and operating parameters used for the carbonizations are indicated in the respective inventive and comparative examples.

Classifying/Sieving:

The Si/C composite particles obtained after the carbonization were freed from oversize >20 μm by wet sieving with an AS 200 basic sieving machine (Retsch GmbH) using water on stainless steel sieves. The composite powder was dispersed in ethanol by means of ultrasound (Hielscher UIS250V; amplitude 80%, cycle: 0.75; duration; 30 min) (20% solids content) and applied to the sieving tower with a sieve (20 μm). Sieving was carried out with an infinite time preselection and with an amplitude of 50-70%, with a traversing flow of water. The composite-containing suspension emerging at the bottom was filtered through 200 nm nylon membrane, and the filter residue was dried to constant mass in a vacuum drying oven at 100° C. and 50-80 mbar.

The following materials were acquired from commercial sources or produced in house and used directly without further purification:

Dried, silicon nanopowder (unaggregated, sliver-shaped Si particles produced in house by wet milling in a stirred ball mill in 2-propanol (solids content 15.7 wt %, $D_{50}$=200 nm)), polyacrylonitrile (H-PAN; Mw=200 000; $D_{50}$=48 μm; from Dolan), conductive carbon black (Super P, from Imerys/Timcal), graphite (KS6L, from Imerys), activated carbon (Contarbon, from Donau-Carbon, ground to $D_{50}$=5 μm), pitch (high-melting; softening point 235° C.), polyvinyl chloride (PVC) (from Sigma-Aldrich, Art. No. 389293); polyvinyl acetate dispersion (Vinnapas EAF380; from Wacker Chemie AG).

Example 1

Polyacrylonitrile-based Si/C composite with conductive carbon black as C additive:

5.4 g of polyacrylonitrile powder (PAN), 5.4 g of conductive carbon black, and 6.0 g of dry silicon nanopowder (D50: 200 nm) were placed together with 3 zirconium oxide balls (20 mm diameter) in a polypropylene beaker (125 ml) and the contents of the beaker were mixed over the course of 14 hours on a laboratory roller mixer (model SRT6D, from Stuart) at 125 rpm. This gave a Si/conductive carbon black/PAN powder mixture in the form of agglomerates.

The agglomerate can be separated again by exposure to ultrasound, to give the bimodal particle size distribution which can be correlated, with the starting components.

13.7 g of the Si/conductive carbon black/PAN powder mixture in the form of agglomerates were introduced into a fused silica boat (QCS GmbH) and carbonized in a three-zone tube furnace (TFZ 12/65/550/E301; from Carbolite) using cascade regulation, including a type N probe element with forming gas (95% $N_2$, 5% Hz) as inert gas: initially heating rate 10° C./min, temperature 300° C., hold time 90 min, $N_2/H_2$ flow rate 200 ml/min; then directly continuing with heating rate 10° C./min, temperature 1000° C., hold time 3 h, $N_2/H_2$ flow rate 200 ml/min. After cooling, 11.2 g of a black powder were obtained (82% yield based on initial mass), of which 11.0 g was freed from oversize >20 μm by sieving.

This gave 10.2 g of a black powder <20 μm (degree of aggregation 7%) which according to SEM analysis (FIG. 1) consisted of unaggregated, microscale Si/C composite particles, which in the interior contained conductive carbon black particles and nano-Si particles and had a monomodal particle size distribution.

Elemental composition: Si 41.6 wt %; C 53.2 wt %; O 3.15 wt %; N 2.31 wt %;

particle size distribution; monomodal; D10: 0.56 µm; D50; 1.35 µm; D90: 3.99 µm; (D90-D10)/D50≤2.54.

Example 2

Polyacrylonitrile-based Si/C composite with graphite as C additive:

3.2 g of polyacrylonitrile powder (PAN), 3.2 g of graphite, and 3.6 g of dry silicon nanopowder (D50: 200 nm) were placed together with 3 zirconium oxide balls (20 mm diameter) in a polypropylene beaker (125 ml) and the contents of the beaker were mixed over the course of 14 hours on a laboratory roller mixer (model SRT6D, from Stuart) at 125 rpm.

9.1 g of the resulting Si/graphite/PAN powder mixture were introduced into a fused silica boat (QCS GmbH) and carbonized in a three-zone tube furnace (TFZ 12/65/550/E301; from Carbolite GmbH) using cascade regulation, including a type N probe element with forming gas (95% $N_2$, 5% Hz) as inert gas: initially heating rate 10° C./min, temperature 300° C., hold time 90 min, $N_2/H_2$ flow rate 200 ml/min; then directly continuing with heating rate 10° C./min, temperature 1000° C., hold time 3 h, $N_2/H_2$ flow rate 200 ml/min. After cooling, 7.2 g of a black powder were obtained (80% yield based on initial mass), of which 6.9 g was freed from oversize >20 µm by sieving. This gave 6.3 g of a black powder <20 µm (degree of aggregation 9%) which according to SEM analysis consisted of unaggregated, microscale Si/C composite particles, which in the interior contained graphite particles and nano-Si particles. Elemental composition: Si 45.0 wt %; C 51.9 wt %; O 3.58 wt %; N 1.73 wt %;

particle size distribution: bimodal; D10: 0.79 µm; D50: 3.89 µm; D90: 7.12 µm; (D90-D10)/D50=1.63.

Example 3

Polyacrylonitrile-based Si/C composite with activated carbon as C additive:

5.4 g of polyacrylonitrile powder (PAN), 5.4 g of activated carbon, and 6.0 g of dry silicon nanopowder (D50: 200 nm) were placed together with 3 zirconium oxide balls (20 mm diameter) in a polypropylene beaker (125 ml) and the contents of the beaker were mixed over the course of 14 hours on a laboratory roller mixer (model SRT6D, from Stuart) at 125 rpm. 16.2 g of the resulting Si/activated carbon/PAN powder mixture were introduced into a fused silica boat (QCS GmbH) and carbonized in a three-zone tube furnace (TFZ 12/65/550/E301; from Carbolite GmbH) using cascade regulation, including a type N probe element with forming gas (95% $N_2$, 5% Hz) as inert gas: initially heating rate 10° C./min, temperature 300° C., hold time 90 min, $N_2/H_2$ flow rate 200 ml/min; then directly continuing with beating rate 10° C./min, temperature 1000° C., hold time 3 h, $N_2/H_2$ flow rate 200 ml/min. After cooling, 13.4 g of a black powder were obtained (83% yield based on initial mass), of which 1.3 g was freed from oversize >20 µm by sieving. This gave 12.9 g of a black powder <20 µm (degree of aggregation 3%) which according to SEM analysis consisted of unaggregated, microscale Si/C composite particles, which in the interior contained activated carbon particles and nano-Si particles.

Elemental composition: Si 38.0 wt %; C 49.3 wt %; O 7.8 wt %; N 3.18 wt %;

particle size distribution; bimodal; D10: 0.61 µm; D50: 2.64 µm; D90: 8.27 µm; (D90-D10)/D50=2.90.

Example 4 (Comparative)

Pitch-based Si/C composite with conductive carbon black as C additive:

3.2 g of pitch, 3.2 g of conductive carbon black, and 3.6 g of dry silicon nanopowder (D50: 200 nm) were placed together with 3 zirconium oxide balls (20 mm diameter) in a polypropylene beaker (125 ml) and the contents of the beaker were mixed over the course of 14 hours on a laboratory roller mixer (model SRT6D, from Stuart) at 125 rpm.

10.1 g of the resulting Si/conductive carbon black/pitch powder mixture were introduced into a fused silica boat (QCS GmbH) and carbonized in a three-zone tube furnace (TFZ 12/65/550/E301; from Carbolite GmbH) using cascade regulation, including a type N probe element with forcing gas (95% $N_2$, 5% $H_2$) as inert gas: initially heating rate 10° C./min, temperature 300° C., hold time 90 min, $N_2/H_2$ flow rate 200 ml/min; then directly continuing with heating rate 10° C./min, temperature 1000° C., hold time 3 h, $N_2/H_2$ flow rate 200 ml/min. After cooling, 8.7 g of a black powder were obtained (86% yield based on initial mass), of which 8.7 g was freed from oversize >20 µm by sieving. This gave 5.3 g of a black powder <20 µm (degree of aggregation 39%).

Elemental composition: Si 36.6 wt %; C 60.1 wt %; O 3.36 wt %; N 0.5 wt %;

particle size distribution: bimodal; D10: 1.75 µm; D50: 5.57 µm; D90: 10.76 µm; (D90-D10)/D50=1.61.

Example 5 (Comparative)

Polyvinyl chloride-based Si/C composite with conductive carbon black as C additive:

3.2 g of polyvinyl chloride (FVC), 3.2 g of conductive carbon black, and 3.6 g of dry silicon nanopowder (D50: 200 nm) were placed together with 3 zirconium oxide balls (20 mm diameter) in a polypropylene beaker (125 ml) and the contents of the beaker were mixed over the course of 14 hours on a laboratory roller mixer (model SRT6D, from Stuart) at 125 rpm. 10.0 g of the resulting Si/conductive carbon black/PVC powder mixture were introduced into a fused silica boat (QCS GmbH) and carbonized in a three-zone tube furnace (TFZ 12/65/550/E301; from Carbolite GmbH) using cascade regulation, including a type N probe element with forming gas (95% $N_2$, 5% $H_2$) as inert gas: initially heating rate 10° C./min, temperature 300° C., hold time 90 min, $N_2/H_2$ flow rate 200 ml/min; then directly continuing with heating rate 10° C./min, temperature 1000° C., hold time 3 h, $N_2/H_2$ flow rate 200 ml/min. After cooling, 7.2 g of a black powder were obtained (72% yield based on initial mass), of which 7.1 g was freed from oversize >20 µm by sieving. This gave 6.3 g of a black powder <20 µm (degree of aggregation 11%).

Elemental composition: Si 4 5.3 wt %; C 51.2 wt %; O 3.24 wt %; N 0.25 wt %;

particle size distribution; monomodal; D10: 0.57 µm; D50: 2.17 µm; D90: 8.65 µm; (D90-D10)/D50=3.72.

Example 6 (Comparative)

Solvent-based production of unaggregated C microspheres containing conductive carbon black and nano-Si by spray drying: 10.8 g of polyacrylonitrile (PAN) were dissolved at room temperature in 720 ml of dimethylformamide (DMF). 12.6 g of a silicon nanopowder suspension (19.8% in isopropanol; corresponding to 2.55 g of nano-Si) and 3.15 g of conductive carbon black (Super P) were dispersed by means of ultrasound into the PAN solution (Hielscher UIS250V; amplitude 80%, cycle: 0.9; duration: 30 minutes). The resulting dispersion was sprayed and dried with a laboratory spray drier of type B-290 (BÜCHI GmbH) with B-295 inert loop and B-296 dehumidifier (BÜCHI GmbH) (nozzle tip: 0.7 mm; nozzle cap 1.4 mm; nozzle temperature 130° C.; $N_2$ gas flow ~30; aspirator 100%; pump 20%). This gave 13.8 g of a brown-black powder (84% yield). 13.7 g of the resulting Si/conductive carbon black/PAN powder mixture were introduced into a fused silica boat (QCS GmbH) and carbonized in a three-zone tube furnace (TFZ 12/65/550/E301; from Carbolite GmbH) using cascade regulation, including a type N probe element with argon/$H_2$ as inert gas: initially heating rate 10° C./min, temperature 300° C., hold time 90 min. Ar/$H_2$ flow rate 200 ml/min; then directly continuing with heating rate 10° C./min, temperature 1000° C., hold time 3 h, Ar/$H_2$ flow rate 200 ml/min. After cooling, 7.71 g of a black powder were obtained (56% yield based on initial mass) which according to SEM analysis (FIG. 2) consisted of unaggregated, microscale carbon beads, which in the interior contained carbon black particles and nana-Si particles.

Figure 2:
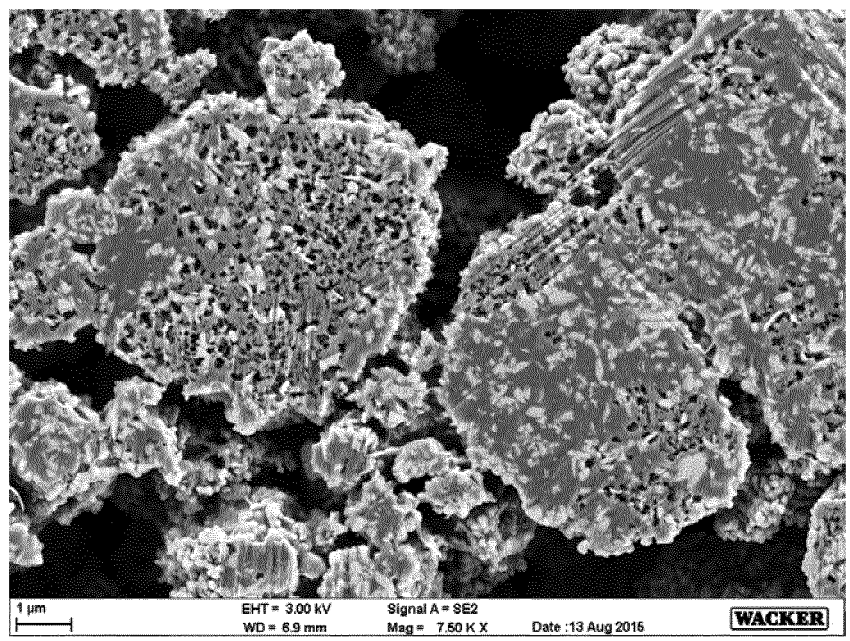
FIG. 2 is an SEM image of unaggregated, microscale carbon beads according to Example 6.

Elemental composition: Si 24.4 wt %; C 65.6 wt %; O 4.62 wt %; N 2.67 wt %; B<50 ppm; P<50 ppm; Al<25 ppm; Ca<50 ppm; Cu<10 ppm; K<50 ppm; Li<10 ppm; Zr 800 ppm;

particle size distribution: monomodal; D10: 4.51 µm; D50: 6.32 µm; D90: 9.54 µm; (D90-D10)/D50=0.85 (FIG. 2).

Example 7

Porous, polyacrylonitrile-based Si/C composite with conductive carbon black as C additive:

5 g of conductive carbon black and 20 g of polyvinyl acetate dispersion (PVAc) (51% in water) were dispersed at room temperature in 800 ml of an ethanol-water mixture (1:1) by means of ultrasound (Hielscher UIS250V; amplitude 80%, cycle: 0.9; duration: 30 minutes). The resulting dispersion was sprayed and dried with a laboratory spray drier of type B-290 (BÜCHI GmbH) with B-295 inert loop and B-296 dehumidifier (BÜCHI GmbH) (nozzle tip: 0.7 mm; nozzle cap 1.4 mm; nozzle temperature 100° C.; $N_2$ gas flow 30; aspirator 100%; pump 20%).

Figure 3:
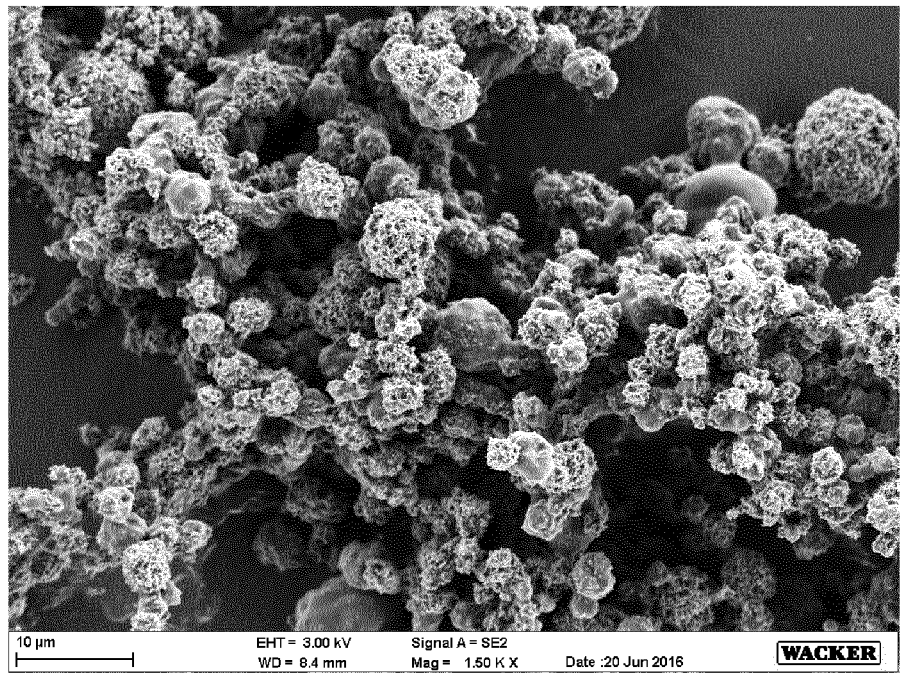
FIG. 3 is an SEM image of PVAc/conductive carbon black microsphere according to Example 7.

This gave 7.5 g of a black powder which according to SEM analysis (FIG. 3) consisted of PVAc/conductive carbon black microspheres.

7.3 g of the resulting PVAc/conductive carbon black microspheres, 2.6 g of polyacrylonitrile powder (PAN), 1.9 g of dry silicon nanopowder (D50: 200 nm) were placed together with 3 zirconium oxide balls (20 mm diameter) in a polypropylene beaker (125 ml) and the contents of the beaker were mixed over the course of 14 hours on a laboratory roller mixer (model SRT6D, from Stuart) at 125 rpm.

10.9 g of the resulting Si/conductive carbon black/PVAc/PAN powder mixture were introduced into a fused silica boat (QCS GmbH) and carbonized in a three-zone tube furnace (TFZ 12/65/550/E301; from Carbolite GmbH) using cascade regulation, including a type N probe element with forming gas (95 $N_2$, 5% $H_2$) as inert gas: initially heating rate 10° C./min, temperature 300° C., hold time 90 min, $N_2/H_2$ flow rate 200 ml/min; then directly continuing with heating rate 10° C./min, temperature 1000° C., hold time 3 h, $N_2/H_2$ flow rate 200 ml/min. After cooling, 5.3 g of a black powder were obtained (49% yield based on initial mass), of which 3.6 g were freed from oversize >20 µm by sieving.

Figure 4:
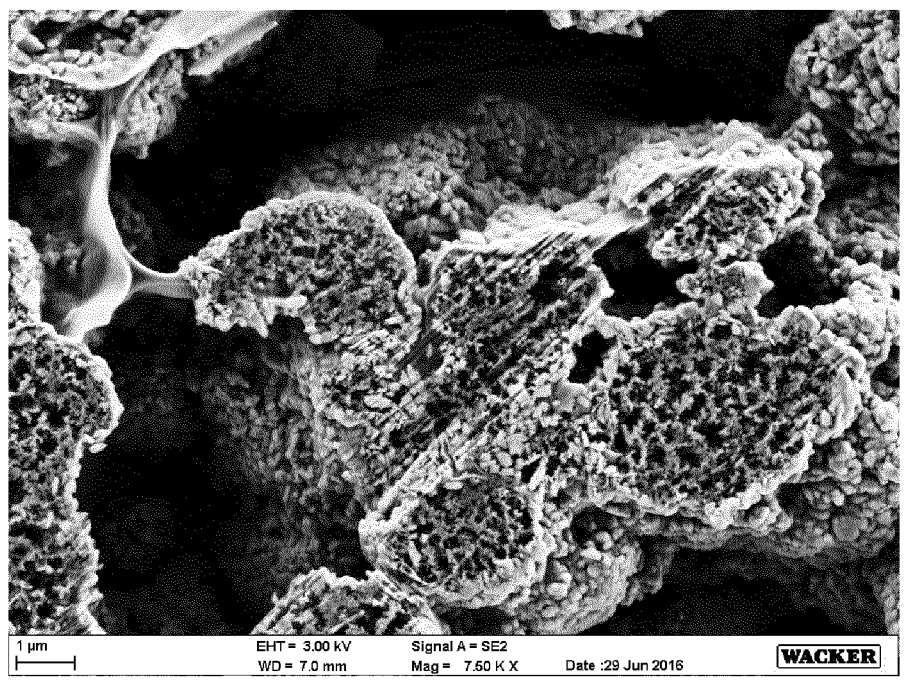
FIG. 4 is an SEM image of unaggregated, microscale, porous Si/C composite articles according to Example 7.

This gave 3.3 g of a black power <20 µm (degree of aggregation 8%) which according to SEM analysis (FIG. 4) consisted of unaggregated, microscale, porous Si/C composite particles, which in the interior contained carbon black particles and nano-Si particles.

The resultant Si/C composite particles were notable in the interior of the particles for an increased porosity.

Elemental composition: Si 32.2 wt %; C 61.2 wt %; O 4.77 wt %; N 1.64 wt %;

particle size distribution; monomodal; D10: 3.85 µm; D50: 6.24 µm; D90: 9.95 µm; (D90-D10)/D50=0.98.

The invention claimed is:

1. A method for producing precomposite particles, comprising:
    dry mixing silicon particles; polyacrylonitrile particles; and one or more carbon additives selected from the group consisting of graphite, fullerene, carbon fibers, glassy carbon, graphene, activated carbon, carbon blacks, carbon nanotubes, carbon nanofoams, and aerographite; optionally one or more organic pore formers, and optionally one or more inorganic adjuvants,
    wherein before and during the dry mixing no solvent is added, wherein the inorganic adjuvants are selected from the group consisting of halides of alkali metals and alkaline earth metals, carbonates of alkali metals, zinc oxide, magnesium carbonate, and nickel sulfide, and
    wherein the polyacrylonitrile, the silicon particles and/or the carbon additives are entirely or partially initially introduced before the mixing or entirely or partially metered in during the mixing,
    with the proviso that if polyacrylonitrile is not present initially, the silicon particles and/or the carbon additives are metered in at least proportionately together with polyacrylonitrile or after addition of polyacrylonitrile,
the precomposite particles, when thermally treated, form Si/C composite particles with a degree of aggregation of less than 20%.

2. The method for producing precomposite particles as claimed in claim 1, wherein the precomposite particles are in the form of agglomerates based on silicon particles, carbon additives, and polyacrylonitrile and also optionally organic pore formers and optionally inorganic adjuvants.

3. The method for producing precomposite particles as claimed in claim 2, wherein the precomposite particles are based on ≥5 wt % and ≤60 wt % on polyacrylonitrile, based on the total weight of the precomposite particles.

4. The method for producing precomposite particles as claimed in claim 3, wherein the one or more carbon additives are selected from the group consisting of graphite, carbon black, activated carbon, carbon nanotubes, fullerenes and graphene.

5. The method for producing precomposite particles as claimed in claim 4, wherein the weight ratio of polyacrylonitrile to carbon additives is ≥0.1 and ≤20.

6. The method for producing precomposite particles as claimed in claim 5, wherein the weight ratio of silicon particles to carbon additives is ≥0.1 and ≤4.

7. The method for producing precomposite particles as claimed in claim 6, wherein the polyacrylonitrile is partially or completely initially introduced before the mixing.

8. The method for producing precomposite particles as claimed in claim 7, wherein the polyacrylonitrile is initially introduced at ≥40 wt %, based on the total weight of the polyacrylonitrile employed overall.

9. The method for producing precomposite particles as claimed in claim 6, wherein the polyacrylonitrile is partially or completely metered in, with the proviso that the amount of silicon particles and/or carbon additives employed overall, or a proportion thereof, is metered in simultaneously with polyacrylonitrile or is metered in after the complete addition of polyacrylonitrile.

10. The method for producing precomposite particles as claimed in claim 6, wherein after complete addition of the silicon particles and of the carbon additives, no further polyacrylonitrile is metered in.

11. A method for producing Si/C composite particles, comprising thermally treating the precomposite particles prepared by the process of claim 1.

12. The method of claim 11, wherein polyacrylonitrile is carbonized during the thermal treatment.

13. The method of claim 12, wherein following the thermal treatment, the Si/C composite particles have a degree of aggregation of less than 10%.

14. A method for producing precomposite particles, comprising:
   dry mixing silicon particles; polyacrylonitrile particles; and one or more carbon additives selected from the group consisting of graphite, fullerene, carbon fibers, glassy carbon, graphene, activated carbon, carbon blacks, carbon nanotubes, carbon nanofoams, and aerographite; optionally one or more organic pore formers, and optionally one or more inorganic adjuvants,
   wherein the silicon particles are particles of elemental silicon or an elemental silicon/metal alloy or mixture thereof, wherein before and during the dry mixing no solvent is added, and wherein the inorganic adjuvants are selected from the group consisting of halides of alkali metals and alkaline earth metals, carbonates of alkali metals, zinc oxide, magnesium carbonate, and nickel sulfide,
   wherein the polyacrylonitrile, the silicon particles and/or the carbon additives are entirely or partially initially introduced before the dry mixing or entirely or partially metered in during the dry mixing,
   with the proviso that if polyacrylonitrile is not present initially, the silicon particles and/or the carbon additives are metered in at least proportionately together with polyacrylonitrile or after addition of polyacrylonitrile.

15. A method for producing precomposite particles, comprising:
   dry mixing silicon particles; polyacrylonitrile particles; and one or more carbon additives selected from the group consisting of fullerene, carbon fibers, glassy carbon, activated carbon, carbon blacks, carbon nanotubes, and carbon nanofoams; optionally one or more organic pore formers, and optionally one or more inorganic adjuvants,
   wherein before and during the dry mixing no solvent is added, and wherein the inorganic adjuvants are selected from the group consisting of halides of alkali metals and alkaline earth metals, carbonates of alkali metals, zinc oxide, magnesium carbonate, and nickel sulfide,
   wherein the polyacrylonitrile, the silicon particles and/or the carbon additives are entirely or partially initially introduced before the dry mixing or entirely or partially metered in during the dry mixing,
   with the proviso that if polyacrylonitrile is not present initially, the silicon particles and/or the carbon additives are metered in at least proportionately together with polyacrylonitrile or after addition of polyacrylonitrile.

\* \* \* \* \*